(12) United States Patent
Kobune et al.

(10) Patent No.: US 9,568,061 B2
(45) Date of Patent: Feb. 14, 2017

(54) BRAKE PAD FOR YAW CONTROL, AND BRAKE MEMBER

(75) Inventors: Mika Kobune, Tsukuba (JP); Akira Nagai, Tsukuba (JP); Atsushi Fujita, Hitachi (JP); Kouichi Ueda, Hitachi (JP); Masayoshi Arakawa, Hitachi (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/408,571

(22) PCT Filed: Jul. 23, 2012

(86) PCT No.: PCT/JP2012/068602
§ 371 (c)(1),
(2), (4) Date: Dec. 17, 2014

(87) PCT Pub. No.: WO2014/016891
PCT Pub. Date: Jan. 30, 2014

(65) Prior Publication Data
US 2015/0308532 A1     Oct. 29, 2015

(51) Int. Cl.
*F16D 69/02*     (2006.01)
*F16D 69/00*     (2006.01)

(52) U.S. Cl.
CPC ....... *F16D 69/026* (2013.01); *F16D 2069/005* (2013.01); *F16D 2069/008* (2013.01); *F16D 2200/0078* (2013.01); *F16D 2200/0086* (2013.01); *F16D 2200/0091* (2013.01)

(58) Field of Classification Search
CPC ............. F16D 69/026; F16D 2069/008; F16D 2069/005; F16D 2200/0086; F16D 2200/0078; F16D 2200/0091

USPC ...................................................... 188/251 A
See application file for complete search history.

(56) References Cited

U.S. PATENT DOCUMENTS

| | | | | |
|---|---|---|---|---|
| 2,989,657 A | * | 6/1961 | Sampson | B29C 70/00 139/420 C |
| 4,045,608 A | * | 8/1977 | Todd | F16D 69/021 156/278 |
| 4,997,067 A | * | 3/1991 | Watts | F16D 49/00 188/250 B |
| 5,230,952 A | * | 7/1993 | McCord | C08L 27/18 188/251 A |
| 5,646,076 A | * | 7/1997 | Bortz | D04H 1/46 188/251 A |

FOREIGN PATENT DOCUMENTS

| | | |
|---|---|---|
| CN | 1628015 A | 6/2005 |
| CN | 101956775 A | 1/2011 |
| JP | S 49-023564 | 6/1972 |

(Continued)

OTHER PUBLICATIONS

International Preliminary Report of Appln. No. PCT/JP2012/068602 dated Feb. 5, 2015 in English.

(Continued)

*Primary Examiner* — Melanie Torres Williams
(74) *Attorney, Agent, or Firm* — Fitch, Even, Tabin & Flannery, LLP

(57) ABSTRACT

Disclosed is a brake pad for yaw control comprising: a braking part having a braking surface, and including a fluororesin fiber assembly and a matrix resin infiltrated into the fluororesin fiber assembly.

16 Claims, 4 Drawing Sheets

(56) References Cited

FOREIGN PATENT DOCUMENTS

| | | |
|---|---|---|
| JP | 04-153291 | 5/1992 |
| JP | 04-306285 | 10/1992 |
| JP | H 05-138790 | 6/1993 |
| JP | 07-062329 | 3/1995 |
| JP | 08-082277 | 3/1996 |
| JP | 2002-348390 | 12/2002 |
| JP | 2003-528261 | 9/2003 |
| JP | 2004-232500 | 8/2004 |
| JP | 2006-518413 | 8/2006 |
| JP | 2006-249129 | 9/2006 |
| JP | 2008-001883 | 1/2008 |

OTHER PUBLICATIONS

JP Office Action of Appln. No. 2011-011825 dated Oct. 2, 2014.
International Search Report of Appln. No. PCT/JP2012/068602 dated Sep. 4, 2012 in English.
Office Action in counterpart CN Appln. No. 201280074751.7 dated May 30, 2016.

* cited by examiner (a)

(b)

BRAKE PAD FOR YAW CONTROL, AND BRAKE MEMBER

TECHNICAL FIELD

The present invention relates to a brake pad for yaw control and a brake member using the same.

BACKGROUND ART

Hitherto, there are known, for example, a phenolic resin molding material (for example, see Patent Literature 1), a carbon material (for example, see Patent Literature 2), and the like as materials having abrasion resistance in a condition without lubrication.

CITATION LIST

Patent Literature

Patent Literature 1: JP 2008-001883 A
Patent Literature 2: JP 2008-249129 A

SUMMARY OF INVENTION

Technical Problem

There is a case where a yaw of a windmill is controlled by a brake pad provided in a bearing of the windmill. Here, in structure, the brake pad for yaw control receives a high-pressure load for a long period of time due to the mass of the nacelle of the windmill and the like.

When the resin material or the carbon material of the related art is used for the brake pad for yaw control, a problem arises in that the brake pad is easily broken due to the insufficient strength for the high-pressure load. That is, it is very difficult to obtain the brake pad which has high compression strength capable of withstanding a high load for a long period of time while having high abrasion resistance necessary for the yaw control.

Therefore, an object of the invention is to provide a brake pad for yaw control which has high compression strength capable of withstanding a high load for a long period of time and has excellent abrasion resistance.

Solution to Problem

The invention relates to a brake pad for yaw control comprising: a braking part including a braking surface and including a fluororesin fiber assembly and a matrix resin infiltrated into the fluororesin fiber assembly.

The brake pad according to the invention has high compression strength capable of withstanding a high load for a long period of time and has excellent abrasion resistance.

The ratio of the matrix resin in the braking part may be 20 to 50 mass % with respect to the total mass of the braking part. Further, the fluororesin fiber assembly may be also a fabric. The brake pad with this configuration is more advantageous in that the compression strength and the abrasion resistance are excellent.

The brake pad according to the invention may further include a base part which supports the braking part while being provided on the opposite side to the braking surface of the braking part. The base part may include a non-fluororesin fiber assembly and a matrix resin infiltrated into the non-fluororesin fiber assembly.

The braking part may further include the non-fluororesin fiber assembly, and the fluororesin fiber assembly and the non-fluororesin fiber assembly may be laminated alternately.

The non-fluor resin fiber assembly may be an assembly which is formed of at least one fiber selected from cotton, wool, silk, linen, rayon, nylon, acrylic, vinylon, polyester, polyolefin, polyurethane, aramid, boron, xyron, glass, and carbon.

The brake pad may include twenty to sixty sheet-shaped fluororesin fiber assemblies, and the fiber assemblies may be laminated. Alternatively, the brake pad may include a sheet-shaped fluororesin fiber assembly and a sheet-shaped non-fluororesin fiber assembly, the number of the total fiber assemblies may be twenty to sixty, and the fiber assemblies may be laminated.

The matrix resin may be, for example, a cured material of a phenolic resin composition or an epoxy resin composition.

In another aspect, the invention relates to a brake member for yaw control of a windmill including a support member with a hollow part and a brake pad fitted in the hollow part. The brake member according to the invention includes the brake pad for yaw control according to the invention.

Advantageous Effects of Invention

According to the invention, it is possible to obtain a brake pad which has high compression strength capable of withstanding a high load for a long period of time and has excellent abrasion resistance.

DESCRIPTION OF EMBODIMENTS

Hereinafter, embodiments of the invention will be described in detail. However, the invention is not limited to the embodiments below.

Figure 1:
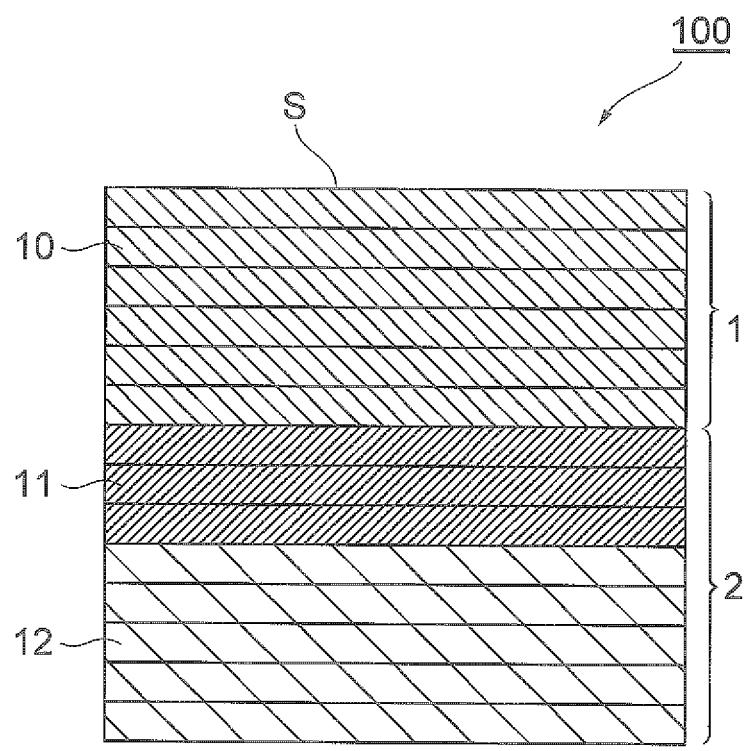
FIG. 1 is a cross-sectional view schematically illustrating an embodiment of a brake pad.

FIG. 1 is a cross-sectional view illustrating an embodiment of a brake pad. A brake pad 100 illustrated in FIG. 1 includes a braking part 1 which includes a flat braking surface S and a base part 2 which is provided on the opposite side to the braking surface S of the braking part 1 and supports the braking part 1.

A friction resistance for yaw control is applied to a member to be braked through the contact between the braking surface S of the braking part 1 and the member to be braked. The braking part 1 includes a plurality of fluororesin fiber reinforced layers 10 including a sheet-shaped fluororesin fiber assembly and a matrix resin infiltrated into the sheet-shaped fluororesin fiber assembly. The fluororesin fiber assemblies included in each fluororesin fiber reinforced layer 10 are laminated along the direction perpendicular to the principal surfaces thereof. The matrix resins of the adjacent fluororesin fiber reinforced layers 10 are generally integrated, and hence a clear boundary surface is not formed therebetween in many cases.

Since the braking part 1 includes the fluor resin fiber assembly and the matrix resin, the brake pad 100 may have a low friction coefficient that does not damage the member to be braked even when a high load is applied to the brake pad due to the mass of the member to be braked while having abrasion resistance equal to or greater than that of the resin material and the carbon sintered body of the related art.

The fluororesin fiber assembly composing the braking part 1 is mainly formed of fluororesin fiber. Here, for the purpose of improving the wettability of the fluororesin fiber to a resin or the like and decreasing the production cost, the fluororesin fiber assembly may include other fiber materials through a method such as uniting, twisting, or mixing in the range in which the low-friction characteristic of the fluororesin fiber is not affected.

The fluororesin fiber assembly and the non fluororesin fiber assembly to be described later may be a fabric, web, union fabric, or felt. By using such fiber assemblies, it is possible to more effectively prevent the brake pad from being broken when a high load is applied to the brake pad. From the viewpoint of the impregnation property of the matrix resin, the fiber assembly may be a fabric of which the void ratio is easily adjusted.

The fluororesin fiber forming the fluororesin fiber assembly may include, for example, one or two or more fibers selected from a group consisting of a polytetrafluoroethylene (PTFE) fiber, a tetrafluoroethylene-hexafluoropropylene copolymer (FEP) fiber, a tetmfluoroethylene-p-fluoroalkyl-vinylether copolymer (PFA) fiber, a polychlorotrifuruoro-ethylene (PCTFE) fiber, and an ethylene-tetrafluoroethylene copolymer (ETFE). From the viewpoint of the abrasion resistance, for example, the PTFE fiber can be selected.

The base part 2 includes a plurality of non-fluororesin fiber reinforced layers 11 and 12 including a sheet-shaped non-fluororesin fiber assembly and a matrix resin infiltrated into the sheet-shaped non-fluororesin fiber assembly. In the brake pad 100 according to the embodiment of FIG. 1, the non-fluororesin fiber reinforced layer 11 and the non-fluororesin fiber reinforced layer 12 include different non-fluororesin fibers.

The braking part 1 which contacts the member to be braked requires excellent abrasion resistance and strength to withstand a high load. On the contrary, the base part 2 requires strength to withstand a high load, but does not require high abrasion resistance since the base part does not contact the member to be braked when the brake pad is used. For this reason, the base part 2 may be formed of a material having strength to withstand a high load. Since the brake pad includes a double-layer structure of the braking part 1 and the base part 2 having different lamination configurations and the fluororesin fiber having abrasion resistance is used only in the braking part 1, the usage amount of the expensive fluororesin fiber may be decreased. Accordingly, it is possible to achieve both of low cost and high abrasion resistance.

The non-fluororesin fiber assembly includes, for example, at least one fiber selected from cotton, wool, silk, linen, rayon, nylon, acrylic, vinylon, polyester, polyolefin, polyurethane, aramid, boron, xyron, glass, and carbon. From the viewpoint of low cost, cotton of natural fiber, polyester of synthetic fiber, or glass of inorganic fiber can be selected. From the viewpoint of high strength, linen of natural fiber, aramid fiber of synthetic fiber, or carbon fiber of inorganic fiber can be selected.

The matrix resin composing the brake pad may be a cured material of a thermosetting resin composition including one or two or more of thermosetting resins selected from phenolic resin, epoxy resin, vinylester resin, unsaturated polyester resin and the like or may be a thermoplastic resin selected from polyamide, polyacetal and the like. From the viewpoint of the thermal resistance, the thermosetting resin composition can be selected. The phenolic resin has good wettability to fluororesin fiber. The epoxy resin has good adhesiveness with fibers and also has an excellent mechanical characteristic. The compositions of the matrix resin of the resin fiber reinforced layers composing the braking part and the base part may be the same as each other or different from each other.

As the phenolic resin, for example, novolac phenolic resin, resol phenolic resin, or both of them can be used. From the viewpoint of the molding stability, the resol phenolic resin can be selected.

The epoxy resin may be, for example, at least one selected from a group consisting of bisphenol-A-glycidylether-type epoxy resin, bisphenol-F-glycidylether-type epoxy resin, bisphenol-S-glycidylether-type epoxy resin, bisphenol-AD-glycidylether-type epoxy resin, phenol novolac epoxy resin, biphenyl epoxy resin, and cresol novolac epoxy resin.

The content of the matrix resin (the ratio of the matrix resin with respect to the total mass of the fiber assembly and the matrix resin) may be 20 to 50 mass %. When the content of the matrix resin is in the range of 20 to 50 mass %, there is a tendency that the strength and the friction characteristic as the brake pad can be particularly good. From the same viewpoint, the content of the matrix resin may be 25 to 45 mass % or 30 to 40 mass %. The content of the matrix resin of the braking part may be in the above-described range and the content of the matrix resin in the entire brake pad may be in the above-described range.

Figure 2:
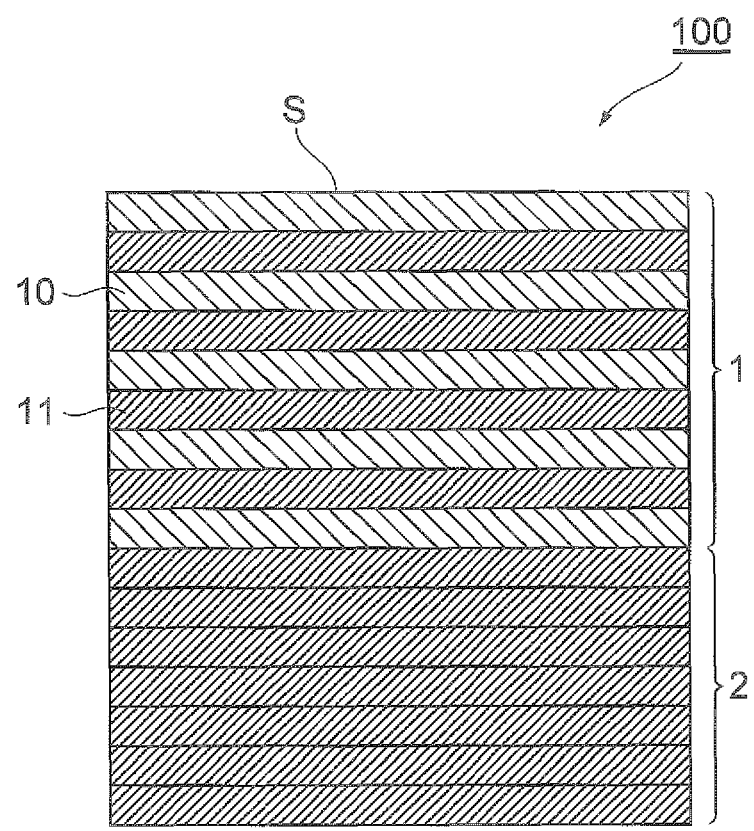
FIG. 2 is a cross-sectional view schematically illustrating another embodiment of a brake pad.

FIG. 2 is also a cross-sectional view illustrating an embodiment of the brake pad. The brake pad 100 illustrated in FIG. 2 includes a braking part 1 which has a braking surface S, and a base part 2 which is provided on the opposite side to the braking surface S of the braking part 1 and supports the braking part 1. In the braking part 1, a fluororesin fiber reinforced layer 10 including a fluororesin fiber assembly and a non-fluororesin fiber reinforced layer 11 including a non-fluororesin fiber assembly are laminated alternately. Since the fluororesin fiber assembly and the fiber assembly formed of other material are laminated alternately in this manner, the production cost can be further decreased. In this case, the abrasion resistance decreases slightly, but the degree of decrease is minimal, and the sufficient abrasion resistance to be workable for practical use can be obtained. The base part 2 of the brake pad 2 illustrated in FIG. 2 are composed of a plurality of non-fluororesin fiber reinforced layers 11.

Figure 3:
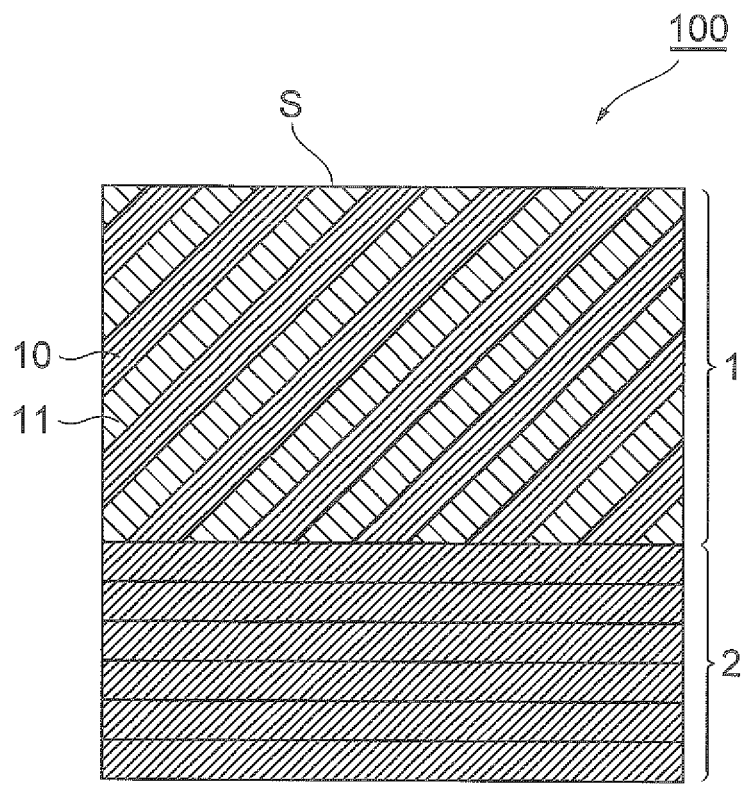
FIG. 3 is a cross-sectional view schematically illustrating another embodiment of a brake pad.

FIG. 3 is also a cross-sectional view illustrating an embodiment of the brake pad. The brake pad 100 illustrated in FIG. 3 is different from the brake pad of FIG. 2 in that the lamination direction (the direction perpendicular to the principal surfaces of the layers) of the fiber assembly (the resin fiber reinforced layer) of the braking part 1 is inclined with respect to the braking surface S. By adopting this configuration, it is possible to maintain a state where the fluororesin fiber is exposed to the braking surface S as the outermost surface even when the brake pad is abraded by the friction for a long period of time. For that reason, it is possible to further improve the abrasion resistance while decreasing the product cost using the non-fluororesin fiber. In order to obtain the low-friction characteristic of the fluororesin fiber to the utmost extent, the angle (the inclination angle) with respect to the braking surface S of the lamination direction of the fiber assembly may be 2 to 90°. From the viewpoint of the molding process, since the yield of the molding process can be increased when the inclination angle is small, the inclination angle may be 2 to 30°.

The brake pad according to the invention is not limited to the above-described embodiment, and may be appropriately modified without departing from the spirit of the invention. For example, there is no need to essentially provide the base part formed of a non-fluororesin fiber reinforced layer. Further, a fluororesin fiber reinforced layer may be further provided, separately from the braking part including the braking surface, at the lower side (the opposite side to the braking part) of the non-fluororesin fiber reinforced layer (the base part). In this way, when a sandwich structure is employed which includes the non-fluororesin fiber reinforced layer and the fluororesin fiber reinforced layers sandwiching the non-fluororesin fiber reinforced layer, the lamination configuration becomes symmetric in the vertical direction or similar thereto, and hence an effect of decreasing warpage can be obtained.

Figure 4:
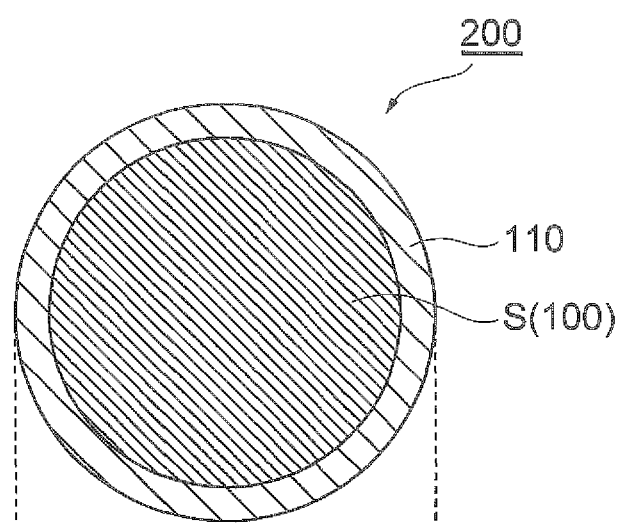
FIG. 4 is a schematic view illustrating an embodiment of a brake member.
Figure 4:
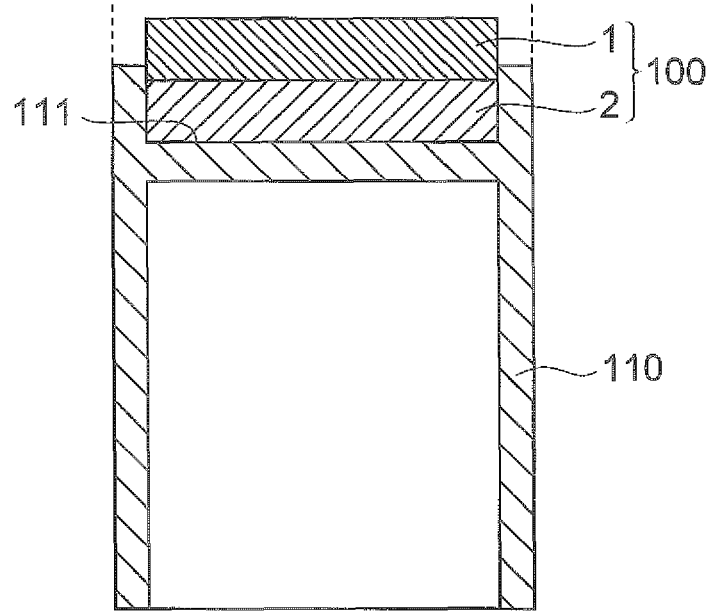

FIGS. 4(a) and 4(b) are top and cross-sectional views respectively illustrating an embodiment of a brake member for yaw control. A brake member 200 illustrated in FIG. 4 includes a support member 110 with a cylindrical hollow part 111 and the cylindrical brake pad 100 according to the embodiment fitted in the hollow part 111. A plurality of the brake members 200 are attached to a bearing of a windmill, and is appropriately used as a brake member of a yaw control device that causes a windmill rotation surface to track the changing wind direction. The support member is made with, for example, brass.

Since the brake pad (the disk pad) which is incorporated in the brake member is subjected to a load by the mass of the nacelle and wind, and is further subjected to a dynamic load during the yaw operation, there is a need to ensure strength and durability to withstand the load. Since the brake pad according to the embodiment has excellent strength and durability, it is possible to effectively suppress the breakage and the damage when the brake pad is used for a long period of time.

Since the brake pad is continuously abraded, there is a need to periodically replace the brake pad. However, it is desirable to decrease the replacement frequency as much as possible. Since the brake pad according to the embodiment has high abrasion resistance, the product life is long and the replacement frequency can be decreased. Further, since the abrasion resistance is improved, it is possible to decrease the thickness of the braking part while maintaining a long product life. As a result, advantages of decreasing the weight of the brake member, decreasing the cost of the raw material, and decreasing the amount of abrasion powder can be obtained.

EXAMPLES

Hereinafter, the invention will be described in more specifically through examples. However, the scope of the invention is not limited to the examples.

(Production of Prepreg)

PTFE fiber woven fabric (Toray Industries, Inc., Product Name: Toyoflon (Trade Mark), Product Number: 2402, and Weight per area: 201 g/m$^2$) and glass fiber woven fabric (Nitto Boseki Co., Ltd., and Weight per area: 570 g/m$^2$) which were cut into the size of 100 mm×100 mm were respectively immersed into a resol phenolic resin solution (Hitachi Chemical Company, Ltd. and Product Name: VP-51 N), and were raised. The woven fabric impregnated with the resin solution was dried through heating at 110° C. for 10 minutes, and hence prepreg having the PTFE fiber woven fabric or glass fiber woven fabric and a matrix resin infiltrated thereinto was obtained. The matrix resin impregnation ratio (the ratio of the matrix resin with respect to the mass of the prepreg) after the drying treatment was 37 mass % in the prepreg of the PTFE resin fiber woven fabric and was 45 mass % in the prepreg of the glass fiber woven fabric. The impregnation ratio of the matrix resin is a value obtained by dividing the matrix impregnation amount by the total mass of the prepreg on the assumption that the value obtained by subtracting the mass of each woven fabric from the mass of the dried prepreg is set as the matrix resin impregnation amount. The obtained prepreg was used to produce molded articles of Examples and Comparative Examples below.

Example 1

Production of Molded Article

Fifty sheets of the prepreg of the PTFE fiber woven fabric were laminated, pressed at 165° C. and 8 MPa for 10 minutes by using a 300-ton hydraulic molding machine (Toho Press Seisakusho Co., Ltd.), and then heated at 180° C. for 1 hour, and hence an molded article having a thickness of 7.5 mm and including a cured material of a phenolic resin as a matrix resin was obtained. In the obtained molded article, the value of PTFE resin fiber/matrix resin was 66/34 (mass %). The content of the fiber and the matrix resin is a value which is obtained by dividing the content of the fiber woven fabric or the matrix resin by the total mass of the molded article on the assumption that the value obtained by subtracting the mass of the used fiber woven fabric from the mass of the obtained molded article is set as the content of the matrix resin.

(Compression Strength Test)

The compression strength test was performed based on JIS-A 1108 by applying a load to the molded article in the lamination direction of the prepreg using an Amsler type universal testing machine (Shimadzu Corporation). The compression strength was 210 MPa.

(Abrasion Test)

The abrasion test was performed by using a ring-on disk type abrasion testing machine (Ibasei Co., Ltd.). A ring (Material: SUS304 (JIS-G 4303: 2005), Outer Diameter: 34 mm, Inner Diameter: 25.6 mm, Width: 4.2 mm) was pressed against the PTFE fiber woven fabric side of the sample cut into the size of 50 mm×10 mm×5 mm, and the measurement was conducted for 8 hours on the condition that the surface pressure was 8 MPa and the rotation speed was 0.16 m/s. The abrasion depth per unit time was 0.02 mm/h.

Example 2

Seventeen sheets of the prepreg of the PTFE fiber woven fabric, one sheet of the prepreg of the glass fiber woven fabric, and forty sheets of the prepreg of the cotton fiber fabric (Hitachi Chemical Co., Ltd., Product Name: GP-51 NS, and Matrix Resin Impregnation Ratio: 60 mass %) were sequentially laminated. The obtained lamination structure was pressed at 165° C. and 8 MPa for 10 minutes by using a 300-ton hydraulic molding machine (Toho Press Seisakusho Co., Ltd.), then heated at 180° C. for 1 hour, and hence an molded article was obtained which was comprised of a control part (Thickness: 2.6 mm) including the PTFE fiber woven fabric and a base part (Thickness: 4.0 mm) including a glass fiber woven fabric reinforced layer including the glass fiber woven fabric and a cotton fiber reinforced layer including the cotton fiber fabric. In the obtained molded article, the value of PTFE resin fiber/glass fiber/cotton fiber/matrix resin was 31/5/31/33 (mass %).

Similarly to Example 1, the obtained molded article was subjected to the compression strength test and the abrasion test. The compression strength was 300 MPa and the abrasion depth per unit time was 0.02 mm/h.

Example 3

Twenty sheets of the prepreg of the PTFE fiber woven fabric and the prepreg of the cotton fiber fabric were alternately laminated, and forty sheets of the prepreg of the cotton fiber fabric were further laminated therebelow. Similarly to Example 1, the obtained lamination structure was pressed and heated, and hence an molded article was obtained which was comprised of a control part (Thickness: 2.5 mm) in which the PTFE fiber woven fabrics and the cotton fiber woven fabrics are laminated alternatively, and a base part (Thickness: 4.0 mm) in which the cotton fiber fabrics are laminated. In the obtained molded article, the value of PTFE resin fiber/cotton fiber/matrix resin was 20/45/35 (mass %).

Similarly to Example 1, the obtained molded article was subjected to the compression strength test and the abrasion test. The compression strength was 280 MPa and the abrasion depth per unit time was 0.10 mm/h.

Example 4

Seventeen sheets of the prepreg of the PTFE fiber woven fabric, sixteen sheets of the prepreg of the cotton fiber fabric (Hitachi Chemical Co., Ltd., and Product Name: GP-51NS), and seventeen sheets of the prepreg of the PTFE fiber woven fabric were sequentially laminated. Similarly to Example 1, the obtained lamination structure was pressed and heated, and hence an molded article was obtained which was comprised of a part (Thickness: 2.5 mm) in which the PTFE fiber woven fabric reinforced layers are laminated, a part (Thickness: 1.7 mm) in which the cotton fiber fabric reinforced resin layers are laminated, and a part (Thickness: 2.5 mm) in which the PTFE fiber woven fabric reinforced layers are laminated. In the obtained molded article, the value of PTFE resin fiber/cotton fiber/matrix resin was 56/11/33 (mass %).

Similarly to Example 1, the obtained molded article was subjected to the compression strength test and the abrasion test. The compression strength was 230 MPa and the abrasion depth per unit time was 0.02 mm/h.

Example 5

Thirty sheets of the prepreg of the PTFE fiber woven fabric and the prepreg of the cotton fiber fabric were alternately laminated. Similarly to Example 1, an molded article was obtained by pressing and heating the obtained lamination structure. The obtained molded article was cut in a direction inclined by 5° with respect to the lamination direction, and a part as the control part having a thickness of 2.5 mm was cut out. Forty sheets of the prepreg of the cotton fiber fabric were laminated thereon, and were pressed and heated similarly to Example 1, to obtain an molded article which was comprised of a control part (Thickness: 2.5 mm) in which the PTFE fibers and the cotton fibers were laminated alternately while inclining, and a base part (Thickness of 4.0 mm) in which the cotton fibers are laminated. In the obtained molded article, the value of PTFE resin fiber/cotton fiber/matrix resin was 21/46/33 (mass %).

Similarly to Example 1, the obtained molded article was subjected to the compression strength test and the abrasion test. The compression strength was 240 MPa and the abrasion depth per unit time was 0.06 mm/h.

Comparative Example 1

An molded article (cotton fiber/matrix resin=67/33 (mass %)) was obtained by pressing and heating a lamination structure obtained by laminating fifty sheets of the prepreg of the cotton fiber woven fabric similarly to Example 1. Similarly to Example 1, the obtained molded article was subjected to the compression strength test and the abrasion test. The compression strength was 260 MPa and the abrasion depth per unit time was 2.0 mm/h.

Comparative Example 2

A carbon sliding material (Hitachi Chemical Company, Ltd., Product Name: Hitalock HCB-10, and Trade Mark: Hitalock) was acquired, and was subjected to the compression strength test and the abrasion test similarly to Example 1. The compression strength was 100 MPa and the abrasion depth per unit time was 0.17 mm/h.

Comparative Example 3

A phenolic resin (Air Water INC., Product Name: Bellpearl S890, and Trade Mark: Bellpearl) of 70 mass % and graphite (Nippon Graphite Industries, ltd., and Product Name: CB 150) of 30 mass % were mixed. The obtained mixture was inserted into a die heated at 150° C., was pressed at 2 MPa for 5 minutes, and was treated at 180° C. for 8 hours, and hence a phenolic resin molded article was obtained. Similarly to Example 1, the obtained molded article was subjected to the compression strength test and the abrasion test. The compression strength was 220 MPa and the abrasion depth per unit time was 0.40 mm/h.

Table 1 shows the compression strength and the abrasion depth of the molded articles of Examples and Comparative Examples.

TABLE 1

| ITEM | Configuration braking part/base part | Compression Strength (MPa) | Abrasion Depth (mm/h) |
|---|---|---|---|
| EXAMPLE 1 | PTFE fiber woven fabric/— | 210 | 0.02 |
| EXAMPLE 2 | PTFE fiber woven fabric/ glass fiber woven fabric + cotton fiber fabric | 300 | 0.02 |
| EXAMPLE 3 | Alternate Lamination of PTFE- cotton/ cotton fiber fabric | 280 | 0.10 |
| EXAMPLE 4 | PTFE fiber woven fabric/ cotton fiber fabric + PTFE fiber woven fabric | 230 | 0.02 |
| EXAMPLE 5 | Alternate Lamination of PTFE- cotton (Inclined by 5°)/ cotton fiber fabric laminated part | 240 | 0.06 |
| COMPARATIVE EXAMPLE 1 | cotton fiber fabric laminated part | 260 | 2.0 |
| COMPARATIVE EXAMPLE 2 | Carbon material | 100 | 0.17 |
| COMPARATIVE EXAMPLE 3 | Phenol material | 220 | 0.40 |

Example 6

The molded article produced in Example 2 and Comparative Examples 2 and 3 were cut in the lamination direction, and the disk-shaped brake pad having a diameter of 80 mm was cut out. The brake pads were applied to the brake member having the configuration illustrated in FIG. 4, and was continuously used in a windmill for 1 year. As a result, it was found that the brake pad of Example 2 can be used without problems with no cracking and chip. Meanwhile, the brake pads of Comparative Example 2 and Comparative Example 3 were not usable continuously since cracking and chip were found after used for one month. Further, it was found that the brake pad of Example 2 had an abrasion amount in which the brake pad was usable for 2 years or more without any replacement.

REFERENCE SIGNS LIST

1 Braking part
2 Base part
10 Fluororesin fiber reinforced layer
11, 12 Non-fluororesin fiber reinforced layer
100 Brake pad
110 Support member
111 Hollow part
200 Brake member
S Braking surface

The invention claimed is:

1. A brake pad for yaw control comprising:
twenty to sixty sheet-shaped fluororesin fiber assemblies, each sheet-shaped fluororesin fiber assembly having a matrix resin infiltrated into a fluororesin fiber assembly, the sheet-shaped fluororesin fiber assemblies being laminated.

2. The brake pad for yaw control according to claim 1, wherein the ratio of the matrix resin in the braking part is 20 to 50 mass % with respect to the total mass of the braking part.

3. The brake pad for yaw control according to claim 1, wherein the fluororesin fiber assembly is a fabric.

4. The brake pad for yaw control according to claim 1, further comprising:
a base part which supports the braking part while being provided at the opposite side to the braking surface of the braking part, the base part including a non-fluororesin fiber assembly and a matrix resin infiltrated into the non-fluororesin fiber assembly.

5. The brake pad for yaw control according to claim 4, wherein the braking part further includes a non-fluororesin fiber assembly, and the fluororesin fiber assembly and the non-fluororesin fiber assembly are laminated alternately.

6. The brake pad for yaw control according to claim 4, wherein the non-fluororesin fiber assembly is an assembly which is formed of at least one fiber selected from cotton, wool, silk, linen, rayon, nylon, acrylic, vinylon, polyester, polyolefin, polyurethane, aramid, boron, xyron, glass, and carbon.

7. The brake pad for yaw control according to claim 1, wherein the matrix resin is a cured material of a phenolic resin composition or an epoxy resin composition.

8. A brake pad for yaw control comprising:
a plurality of sheet-shaped fluororesin fiber assemblies, each sheet-shaped fluororesin fiber assembly having a matrix resin infiltrated into a fluororesin fiber assembly; and
a plurality of sheet-shaped non-fluororesin fiber assemblies each sheet-shaped non-fluororesin fiber assembly having a matrix resin infiltrated into a non-fluororesin fiber assembly,
wherein the number of the total sheet-shaped fiber assemblies is twenty to sixty, and the sheet-shaped fiber assemblies are laminated, and
wherein a braking part having a braking surface includes at least one of the sheet-shaped fluororesin fiber assemblies.

9. The brake pad for yaw control according to claim 8, wherein the ratio of the matrix resin in the braking part is 20 to 50 mass % with respect to the total mass of the braking part.

10. The brake pad for yaw control according to claim 8, wherein the fluororesin fiber assembly is a fabric.

11. The brake pad for yaw control according to claim 8, further comprising:
a base part which supports the braking part while being provided at the opposite side to the braking surface of the braking part, the base part including a non-fluororesin fiber assembly and a matrix resin infiltrated into the non-fluororesin fiber assembly.

12. The brake pad for yaw control according to claim 8, wherein the braking part further includes a sheet-shaped non-fluororesin fiber assembly, and the sheet-shaped fluororesin fiber assembly and the sheet-shaped non-fluororesin fiber assembly are laminated alternately.

13. The brake pad for yaw control according to claim 11, wherein the non-fluororesin fiber assembly is an assembly which is formed of at least one fiber selected from cotton, wool, silk, linen, rayon, nylon, acrylic, vinylon, polyester, polyolefin, polyurethane, aramid, boron, xyron, glass, and carbon.

14. The brake pad for yaw control according to claim 8, wherein the matrix resin is a cured material of a phenolic resin composition or an epoxy resin composition.

15. A brake member for yaw control of a windmill comprising:
a support member that includes a hollow part; and
the brake pad for yaw control according to claim 1 fitted in the hollow part.

16. A brake member for yaw control of a windmill comprising:
a support member that includes a hollow part; and
the brake pad for yaw control according to claim 8 fitted in the hollow part.

* * * * *